(12) United States Patent
Fini et al.

(10) Patent No.: US 12,540,255 B2
(45) Date of Patent: Feb. 3, 2026

(54) SELF-MINERALIZING MULTIFUNCTIONAL COATING COMPOSITION

(71) Applicants: Elham Fini, Phoenix, AZ (US); Albert Hung, Tempe, AZ (US)

(72) Inventors: Elham Fini, Phoenix, AZ (US); Albert Hung, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 449 days.

(21) Appl. No.: 18/156,901

(22) Filed: Jan. 19, 2023

(65) Prior Publication Data

US 2023/0227693 A1   Jul. 20, 2023

Related U.S. Application Data

(60) Provisional application No. 63/300,710, filed on Jan. 19, 2022.

(51) Int. Cl.

| | |
|---|---|
| *C09D 177/12* | (2006.01) |
| *C09D 7/20* | (2018.01) |
| *C09D 7/40* | (2018.01) |
| *C09D 7/61* | (2018.01) |
| *C09D 7/65* | (2018.01) |

(52) U.S. Cl.
CPC .............. *C09D 177/12* (2013.01); *C09D 7/20* (2018.01); *C09D 7/61* (2018.01); *C09D 7/65* (2018.01); *C09D 7/67* (2018.01)

(58) Field of Classification Search
CPC ....................................................... Y02C 20/40
See application file for complete search history.

(56) References Cited

U.S. PATENT DOCUMENTS

| | | | |
|---|---|---|---|
| 2006/0128831 A1* | 6/2006 | Cook | C07C 211/00 |
| | | | 523/160 |
| 2017/0121530 A1* | 5/2017 | Sigmund | C09D 7/62 |
| 2021/0017419 A1* | 1/2021 | Rezaei | C09D 133/08 |
| 2021/0260561 A1* | 8/2021 | Onaizi | B01J 20/28083 |

OTHER PUBLICATIONS

Martin et al., "Aminated Polyethylene Terephthalate (PET) Nanofibers for the Selective Removal of Pb(II) from Polluted Water," 2017, Materials 10, p. 1352. (Year: 2017).*
Kaur et al., "Porous carbons derived from polyethylene terephthalate (PET) waste for CO2 capture studies," 2019, J. of Environmental Management 242, pp. 68-80. (Year: 2019).*
Hack et al., "Review on CO2 Capture Using Amine-Functionalized Materials," 2022, ACS Omega 7, pp. 39520-39530. (Year: 2022).*

(Continued)

*Primary Examiner* — Robert A Vetere
(74) *Attorney, Agent, or Firm* — Fish & Richardson P.C.

(57) ABSTRACT

A coating composition includes alkaline mineral particles including an oxide of an alkaline earth metal and an amine-containing polymer. The amine-containing polymer is adsorbed on the alkaline mineral particles. Forming a coating composition includes at least partially coating alkaline mineral particles with an amine-containing polymer and dispersing the alkaline mineral particles in a liquid to yield the coating composition. The alkaline mineral particles include an oxide of an alkaline earth metal.

18 Claims, 1 Drawing Sheet

(56) References Cited

OTHER PUBLICATIONS

Wang, S.; Li, X.; Wu, H.; Tian, Z.; Xin, Q.; He, G.; Peng, D.; Chen, S.; Yin, Y.; Jiang, Z.; Guiver, M. D., Advances in high permeability polymer-based membrane materials for CO2 separations. Energy & Environmental Science 2016, 9, 1863-1890, DOI: 10.1039/C6EE00811A.

Bui, M.; Adjiman, C. S.; Bardow, A.; Anthony, E. J.; Boston, A.; Brown, S.; Fennell, P. S.; Fuss, S.; Galindo, A.; Hackett, L. A.; Hallett, J. P.; Herzog, H. J.; Jackson, G.; Kemper, J.; Krevor, S.; Maitland, G. C.; Matuszewski, M.; Metcalfe, I. S.; Petit, C.; Puxty, G.; Reimer, J.; Reiner, D. M.; Rubin, E. S.; Scott, S. A.; Shah, N.; Smit, B.; Trusler, J. P. M.; Webley, P.; Wilcox, J.; Mac Dowell, N., Carbon capture and storage (CCS): the way forward. Energy & Environmental Science 2018, 11, 1062-1176, DOI: 10.1039/C7EE02342A.

Sanz-Pérez, E. S.; Murdock, C. R.; Didas, S. A.; Jones, C. W., Direct Capture of CO2 from Ambient Air. Chemical Reviews 2016, 116, 11840-11876, DOI: 10.1021/acs.chemrev.6b00173.

Nikulshina, V.; Gálvez, M. E.; Steinfeld, A., Kinetic analysis of the carbonation reactions for the capture of CO2 from air via the Ca(OH)2-CaCO3-CaO solar thermochemical cycle. Chemical Engineering Journal 2007, 129, 75-83, DOI: https://doi.org/10.1016/j.cej.2006.11.003.

Almajed, A.; Tirkolaei, H. K.; Kavazanjian, E.; Hamdan, N., Enzyme Induced Biocementated Sand with High Strength at Low Carbonate Content. Scientific Reports 2019, 9, 1135, 7 pages, DOI: 10.1038/s41598-018-38361-1.

Li, Xiangyu, et al. "Full daytime sub-ambient radiative cooling in commercial-like paints with high figure of merit." Cell Reports Physical Science 1.10 (2020).

Padhan, R. K.; Gupta, A. A.; Badoni, R. P.; Bhatnagar, A. K., Poly(ethylene terephthalate) waste derived chemicals as an antistripping additive for bitumen—An environment friendly approach for disposal of environmentally hazardous material. Polymer Degradation and Stability 2013, 98, 2592-2601, DOI: 10.1016/j.polymdegradstab.2013.09.019.

Høgsaa, B.; Fini, E. H.; Christiansen, J. d. C.; Hung, A.; Mousavi, M.; Jensen, E. A.; Pahlavan, F.; Pedersen, T. H.; Sanporean, C.-G., A Novel Bioresidue to Compatibilize Sodium Montmorillonite and Linear Low Density Polyethylene. Industrial & Engineering Chemistry Research 2018, 57, 1213-1224, DOI: 10.1021/acs.iecr.7b04178.

Karnati, S. R.; Oldham, D.; Fini, E. H.; Zhang, L., Surface functionalization of silica nanoparticles with swine manure-derived bio-binder to enhance bitumen performance in road pavement. Construction and Building Materials 2021, 266, 121000, 8 pages, DOI: https://doi.org/10.1016/j.conbuildmat.2020.121000.

Dazzi, A.; Prater, C. B., AFM-IR: Technology and Applications in Nanoscale Infrared Spectroscopy and Chemical Imaging. Chemical Reviews 2017, 117, 5146-5173, DOI: 10.1021/acs.chemrev.6b00448.

Fini, E. H.; Hung, A. M.; Roy, A., Active Mineral Fillers Arrest Migrations of Alkane Acids to the Interface of Bitumen and Siliceous Surfaces. ACS Sustainable Chemistry & Engineering 2019, 7, 10340-10348, DOI: 10.1021/acssuschemeng.9b00352.

Hung, A.; Fini, E. H. Surface Morphology and Chemical Mapping of UV-Aged Thin Films of Bitumen. ACS Sustainable Chem. Eng. 2020, 8, 11764-11771.

Borandeh, S.; Abdolmaleki, A.; Zamani Nekuabadi, S.; Sadeghi, M., Methoxy poly (ethylene glycol) methacrylate-TiO2/poly (methyl methacrylate) nanocomposite: an efficient membrane for gas separation. Polymer-Plastics Technology and Engineering 2018, 58, 789-802, DOI: 10.1080/03602559.2018.1520255.

Teplyakov, V. V.; Shalygin, M. G.; Kozlova, A. A.; Chistyakov, A. V.; Tsodikov, M. V.; Netrusov, A. I., Membrane technology in bioconversion of lignocellulose to motor fuel components. Petroleum Chemistry 2017, 57, 747-762, DOI: 10.1134/S0965544117090080.

Hung, A. M.; Kazembeyki, M.; Hoover, C. G.; Fini, E. H., Evolution of Morphological and Nanomechanical Properties of Bitumen Thin Films as a Result of Compositional Changes Due to Ultraviolet Radiation. ACS Sustainable Chemistry & Engineering 2019, 7, 18005-18014, DOI: 10.1021/acssuschemeng.9b04846.

Mason-Delmotte et al., Global Warming of 1.5° C. An IPCC Special Report on the impacts of global warming of 1.5° C. above pre-industrial levels and related global greenhouse gas emission pathways, in the context of strengthening the global response to the threat of climate change, sustainable development, and efforts to eradicate poverty; IPCC, 2018, Cambridge University Press, 631 pages, https://www.ipcc.ch/sr15/.

[No Author Listed], Putting CO2 to Use; IEA: 2019; 86 pages, URL <https://www.iea.org/reports/putting-co2-to-use>.

[No author Listed], Global Energy & CO2 Status Report; IEA: Paris, 2019; 29 pages, URL <https://www.jea.org/reports/global-energy-co2-status-report-2019>.

Geyer, R.; Jambeck, J. R.; Law, K. L., Production, use, and fate of all plastics ever made. Science Advances 2017, 3, e1700782, 6 pages, DOI: 10.1126/sciadv.1700782.

Jambeck, J. R.; Geyer, R.; Wilcox, C.; Siegler, T. R.; Perryman, M.; Andrady, A.; Narayan, R.; Law, K. L., Plastic waste inputs from land into the ocean. Science 2015, 347, 768-771, DOI: 10.1126/science.1260352.

Ritchie, H.; Roser, M. Plastic Pollution Our World in Data [Online], Sep. 2018, retrieved on Aug. 7, 2023, URL<https://ourworldindata.org/plastic-pollution>, 38 pages.

Coates, G. W.; Getzler, Y. D. Y. L., Chemical recycling to monomer for an ideal, circular polymer economy. Nature Reviews Materials 2020, 5, 501-516, DOI: 10.1038/s41578-020-0190-4.

Ignatyev, I. A.; Thielemans, W.; Vander Beke, B., Recycling of Polymers: A Review. ChemSusChem 2014, 7, 1579-1593, DOI: 10.1002/cssc.201300898.

Okan, Meltem, et al. "Current approaches to waste polymer utilization and minimization: a review." Journal of Chemical Technology & Biotechnology 94.1 (2019): 8-21.

Roy, P. S.; Garnier, G.; Allais, F.; Saito, K., Strategic Approach Towards Plastic Waste Valorization: Challenges and Promising Chemical Upcycling Possibilities. ChemSusChem 2021, 14, 4007-4027, DOI: 10.1002/cssc.202100904.

Hung, A. M.; Mousavi, M.; Pahlavan, F.; Fini, E. H., Intermolecular Interactions of Isolated Bio-Oil Compounds and Their Effect on Bitumen Interfaces. ACS Sustainable Chemistry & Engineering 2017, 5, 7920-7931, DOI: 10.1021/acssuschemeng.7b01462.

Høgsaa, B.; Pedersen, T. H.; Mousavi, M.; Hung, A. M.; Jensen, E. A.; Yu, D.; Christiansen, J. d. C.; Sanporean, C.-G.; Fini, E. H., Multiscale Characterization of a Wood-Based Biocrude as a Green Compatibilizing Agent for High-Impact Polystyrene/Halloysite Nanotube Nanocomposites. ACS Omega 2019, 4, 19934-19943, DOI: 10.1021/acsomega.9b02871.

Shariati, Saba, et al. "Interaction mechanisms of polyphosphoric acid and nano clay in bituminous composites." Journal of Colloid and Interface Science 588 (2021): 446-455.

Hung, A. M.; Pahlavan, F.; Shakiba, S.; Chang, S. L. Y.; Louie, S. M.; Fini, E. H., Preventing Assembly and Crystallization of Alkane Acids at the Silica-Bitumen Interface To Enhance Interfacial Resistance to Moisture Damage. Industrial & Engineering Chemistry Research 2019, 58, 21542-21552, DOI: 10.1021/acs.iecr.9604890.

\* cited by examiner

SELF-MINERALIZING MULTIFUNCTIONAL COATING COMPOSITION

CROSS-REFERENCE TO RELATED APPLICATION

This application claims the benefit of U.S. Patent Application No. 63/300,710 filed on Jan. 19, 2022, which is incorporated herein by reference in its entirety.

STATEMENT OF GOVERNMENT SUPPORT

This invention was made with government support under 1928807 awarded by the National Science Foundation. The government has certain rights in the invention.

TECHNICAL FIELD

This invention relates to a self-mineralizing multifunctional coating composition for carbon sequestration, passive cooling, and increasing albedo.

BACKGROUND

Buildings are responsible for 41% of the US primary energy consumption and generate nearly 40% of annual global $CO_2$ emissions, due to their operation that involves heating, cooling, lighting, and plug loads. Buildings are also the main contributor to the urban heat island (UHI) effect in major cities due to the use of construction materials that absorb and store heat.

SUMMARY

This disclosure describes self-mineralizing multifunctional coating composition for carbon sequestration, passive cooling, and increasing albedo. The coating composition includes particles of an alkaline mineral that can carbonate (e.g., self-mineralize) and serve as a permanent carbon-storage medium. The coating composition also includes an amine-containing polymer that initiates $CO_2$ capture and diffusion and imparts ductility to coatings formed from the coating composition. The amine-containing polymers can be sourced from waste plastics. Reflection of incident light or radiation by a coating formed from the coating composition aids in cooling the roof or façade of a building to reduce energy consumption and mitigate the urban heat island effect.

In a first general aspect, a coating composition includes alkaline mineral particles including an oxide of an alkaline earth metal and an amine-containing polymer. The amine-containing polymer is adsorbed on the alkaline mineral particles.

Implementations of the first general aspect can include one or more of the following features.

In some cases, the alkaline mineral particles include one or more of MgO, CaO, $CaSiO_3$, $Ca_2SiO_4$, and $Mg_2SiO_4$. The alkaline mineral particles can have a diameter in a range of about 1 nm to about 100 nm. In some cases, the amine-containing polymer includes one or more of polyethylene terephthalate, poly(methyl methacrylate), poly(allyl amine), poly(vinyl amine), and poly(ethylene imine). In some cases, the first general aspect further includes water, alcohol, or both. In some implementations, the first general aspect further includes one or more resin binders. In some cases, the one or more resin binders includes an epoxy resin, an acrylic resin, or both. The one or more resin binders can include poly(methyl methacrylate), poly[(vinyl acetate)-co-(methy/ethyl/butyl acrylate)], or both. In some implementations, the first general aspect further includes a silicone polymer. The silicone polymer can include a functionalized polysilsesquioxane. In some cases, the functionalized polysilsesquioxane includes poly(dimethylsiloxane).

In some cases, the first general aspect further includes one or more pigments. The coating composition can be a paint. A coating can be formed from the first general aspect. In some cases, the coating composition reflects solar radiation. In some implementations, storing carbon dioxide includes contacting carbon dioxide with the first general aspect, capturing the carbon dioxide with the amine-containing polymer, transporting the carbon dioxide to the oxide of the alkaline earth metal, and forming an alkaline earth metal carbonate species.

In a second general aspect, forming a coating composition includes at least partially coating alkaline mineral particles with an amine-containing polymer and dispersing the alkaline mineral particles in a liquid to yield the coating composition. The alkaline mineral particles include an oxide of an alkaline earth metal.

Implementations of the second general aspect can include one or more of the following features.

In some cases, the coating composition further includes one or both of a resin binder and a silicone polymer. In some cases, the coating composition further includes one or more pigments. The alkaline mineral particles can include one or more of MgO, CaO, $CaSiO_3$, $Ca_2SiO_4$, and $Mg_2SiO_4$. In some implementations, the alkaline mineral particles include nanoparticles. In some cases, the amine-containing polymer includes one or more of polyethylene terephthalate, poly(methyl methacrylate), poly(allyl amine), poly(vinyl amine), and poly(ethylene imine). In some implementations, the amine-containing polymer is formed through aminolysis with an amine containing reagent. In some cases, the amine containing reagent includes ethylene diamine. In some implementations, the amine containing reagent includes ethylene amine oligomers, alkyl diamines, and alkyl amine oligomers. The ethylene amine oligomers can include one or more of diethylenetriamine, triethylenetetramine, tetraethylenepentamine, and pentaethylenehexamine. In some cases, the alkyl diamines include one or more of propanediamine, butanediamine, and pentanediamine. In some implementations, the second general aspect further includes multifunctional amine reagents. The multifunctional amine reagents can promote crosslinking of the amine-containing polymer. In some cases, the multifunctional amine reagents include one or more of tris(2-aminoethyl)amine, tris(3-aminoethyl)amine, and low molecular weight branched poly(ethylene imine).

Advantages provided by aspects of this invention include the ability to capture and store atmospheric carbon, reduce energy consumption, and increase utilization of waste streams and renewable resources. Formulating the coating composition described herein and allowing carbonation to occur on-site allows for capture and utilization of carbon. Advantages of on-site carbon capture include reduction in energy expenditures related to absorbent regeneration and $CO_2$ transport and incorporation of high mineral fractions in the final material without increasing the mineral or solvent content of the coating composition. In addition, an increased strength of coatings formed from the composition due to mineralization over time can compensate for losses in mechanical strength due to aging processes.

The details of one or more embodiments of the subject matter of this disclosure are set forth in the accompanying

DETAILED DESCRIPTION

This disclosure describes self-mineralizing multifunctional coating compositions and composites formed therefrom. The coating composition includes an amine-containing polymer and reflective particles of an alkaline mineral. The amine-containing polymer facilitates capture of carbon dioxide ($CO_2$) at atmospheric concentrations by a composite formed from the coating composition. The captured $CO_2$ diffuses through the composite and reacts with the alkaline mineral to yield a carbonate. The coatings provide $CO_2$ capture and storage as well as solar reflectance. The composite can be in the form of a paint. When the paint is used to coat building materials in an urban setting, the paint promotes cooling of the building materials. This cooling can reduce energy consumption and mitigate urban heat island effects.

Figure 1A:
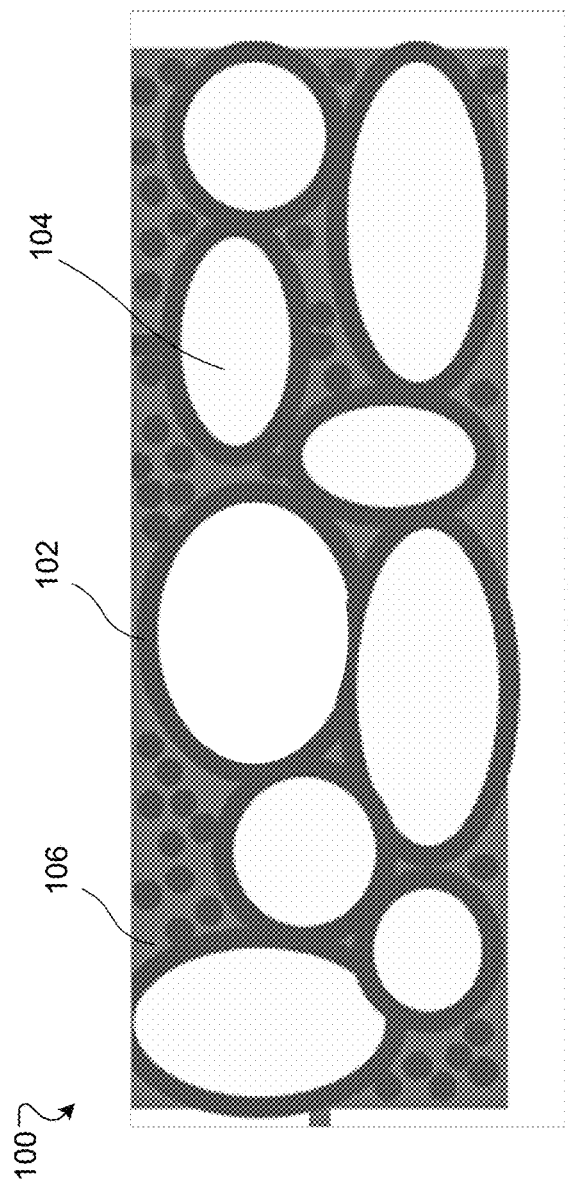
FIG. 1A depicts an example of a $CO_2$-absorbent composite in the form of a coating.

FIG. 1A shows a schematic of a composite 100 in the form of a coating. Composite 100 is formed from a composition that includes amine-containing polymer 102 and alkaline mineral particles 104. Amine-containing polymer 102 is adsorbed on alkaline mineral particles 104. The adsorption can include physical adsorption, chemical adsorption, or both. Examples of forces present in physical adsorption include electrostatic forces and van der Waals forces. One example of chemical adsorption is covalent bonding. The amine-containing polymer 102 facilitates the capture of $CO_2$ and provides a percolating network for transporting the $CO_2$ to the alkaline mineral particles 104. The thickness of the amine-containing polymer 102 on alkaline mineral particles 104 can be in a range of about 0.01 μm to about 1.0 μm.

The composite 100 can include additives 106. The additives 106 can include resin binders, silicone polymers, or both for additional strength or ductility. Suitable resin binders include epoxy resins or acrylic resins such as poly(methyl methacrylate) (PMMA) or poly[(vinyl acetate)-co-(methy/ethyl/butyl acrylate)]. Suitable silicone polymers include methyl/phenyl/methoxy/aminopropyl-functionalized polysiloxanes such as poly(dimethylsiloxane) (PDMS) or similarly functionalized polysilsesquioxanes.

The alkaline mineral particles 104 include an oxide of an alkaline earth metal that can store $CO_2$ by reacting with $CO_2$ to form a carbonate species. Suitable alkaline earth oxides include magnesium oxide (MgO), calcium oxide (CaO), calcium inosilicate ($CaSiO_3$), calcium orthosilicate ($Ca_2SiO_4$), forsterite olivine ($Mg_2SiO_4$). The alkaline mineral particles 104 can be nanoparticles (e.g., with a diameter in a range of about 1 nm to about 100 nm).

The amine-containing polymer is configured to capture $CO_2$ at atmospheric concentrations. Amine groups can be incorporated into a polymer through aminolysis or transesterification with an amine-containing reagent to yield the amine-containing polymer. The amine-containing polymer can include terminal amine groups. Polymers suitable for forming the amine-containing polymer include polyethylene terephthalate (PET), PMMA, poly(allyl amine) (PAA), poly(vinyl amine) (PVAm), poly(ethylene imine) (PEI). Amine-containing reagents suitable for the aminolysis or transesterification reaction include ethylene diamine, related ethylene amine oligomers (e.g., diethylenetriamine, triethylenetetramine, tetraethylenepentamine, pentaethylenehexamine), longer alkyl diamines (e.g., propanediamine, butanediamine, pentanediamine) and related alkyl amine oligomers. In some cases, multifunctional amine reagents are used to promote crosslinking of the amine-containing polymer. Suitable multifunctional reagents include tris(2-aminoethyl)amine, tris(3-aminoethyl)amine, low molecular weight branched PEI.

Figure 1B:
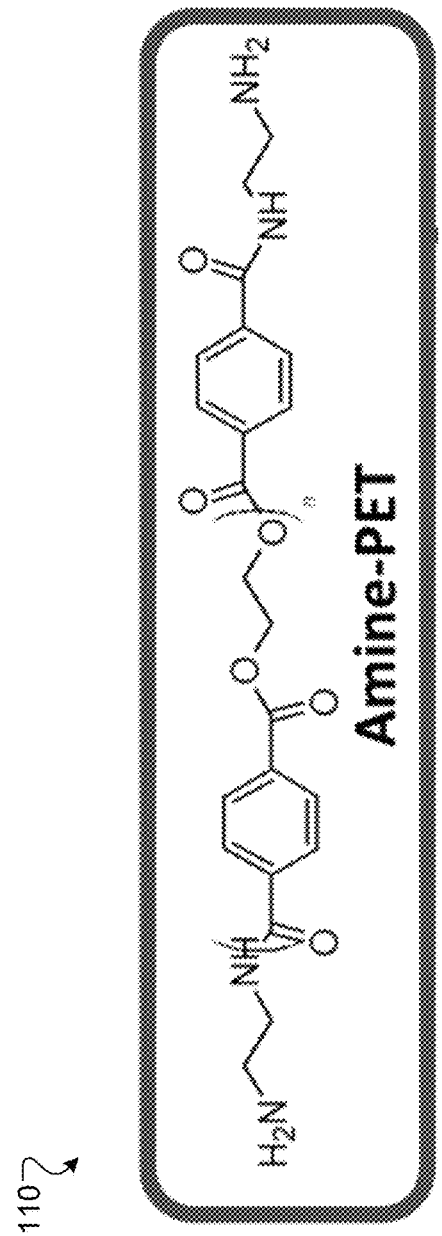
FIG. 1B depicts amine polyethylene terephthalate (amine-PET).

Amine-functionalized waste polyethylene terephthalate (PET) can be used as a precursor material for the amine-containing polymer. The PET can be functionalized with amines through a transesterification reaction. FIG. 1B depicts an example of an amine-containing polymer produced from polyethylene terephthalate (PET) and ethylene diamine. The amine groups of ethylene diamine are incorporated into PET through transesterification of ester bonds to yield amine-PET 110. The PET used for the synthesis of amine-PET 110 can be sourced from waste plastic. The transesterification process breaks down the waste plastic and converts it into a slurry. While PET is insoluble in most solvents, micronized PET particles with an amine-functionalized surface can be dispersed in water or alcohol as a slurry that can be used as a coating. Suitable alcohols include ethanol or propanol.

The composite 100 can include one or more pigments. The composite 100 can be a paint. Carbonation of alkaline mineral particles 104 by $CO_2$ capture results in an increase in radiation reflectance of the composite 100. When the composite 100 is used as a paint on a structure, this increase in radiation reflectance decreases the energy consumption for cooling the structure.

The mechanical properties of the coating can be measured as a function of $CO_2$ exposure time to determine how the mechanical properties change with increased carbonation. Elasticity and yield strength can be measured by tensile testing or dynamic mechanical analysis (DMA), and hardness can be measured by indentation measurements. Since the degree of carbonation can vary with depth into the sample, DMA can give an approximation of the average properties of the sample whereas indentation measurements can better determine the properties of the carbonated surface. Microindentation (e.g., Vickers hardness test) can be used to obtain values for the mechanical properties of the composite as a whole.

The morphology of the composite 100 can be examined by scanning electron microscopy (SEM). Fourier transform infrared spectroscopy (FTIR) can be used to measure chemical composition. An average composite thickness can be estimated based on the Brunauer-Emmett-Teller (BET) surface area and thermogravimetric analysis (TGA) measurements of the organic-inorganic mass ratio. The composite thickness and morphology can also be examined by cutting sample cross-sections of the composite and imaging them with SEM or atomic force microscopy (AFM). The crystal structure can be characterized by X-ray diffraction (XRD). A smaller size of the alkaline mineral particles 104 provides more surface area and accelerates $CO_2$ absorption. Table 1 lists properties of MgO and its estimated maximum capacity for $CO_2$ absorption.

TABLE 1

Properties of MgO and estimated capacity for $CO_2$ absorption.

| | |
|---|---|
| Molecular Weight | 40.3 g/mol |
| Density | 3.6 g/cm$^3$ |
| Max. $CO_2$ capacity of mineral | 1.09 g ($CO_2$)/g (mineral) |
| Max. $CO_2$ capacity of paint (0.2 mm thick coating)* | 262 g ($CO_2$)/m$^2$ 3,800 m$^2$/metric ton $CO_2$ |

*Calculated based on paint composed of 60 wt % mineral content, density of organic phase 1.2 g/cm$^3$, and ignoring any $CO_2$ held by organic amines The speed of $CO_2$ absorption and the capacity of the mineral powders or composite mixtures can be measured using a TGA instrument where $CO_2$ concentration, water-vapor content, and temperature can be controlled and monitored in real-time. For measurements of absorption over longer periods of days or weeks, a system can be used in which a closed container is pressurized with $CO_2$ gas and the pressure decrease is measured over time.

The absorption speed and diffusion depth of $CO_2$ can be measured in a closed-chamber system using samples of the composite greater than 0.5 mm thick with only the top surface exposed to better mimic the performance of a paint coating. After $CO_2$ exposure, the sample can be fractured or cut to expose a cross-section that can be characterized by SEM and energy-dispersive X-ray spectroscopy (EDX). Microscopy of a simple fractured sample can reveal qualitative aspects of particle packing, morphology change with $CO_2$ absorption, and adhesion between inorganic and organic phases. Cutting and polishing the sample can reveal cross-sections of mineral particles, and the distribution of carbon in the section can be mapped by EDX. This analysis shows the depth of $CO_2$ diffusion into the coating as well as into any individual mineral particle.

Combined AFM and infrared absorption spectroscopy (AFM-IR) can be used to analyze the organic-inorganic surface. AFM-IR uses a wavelength-tunable IR laser to simultaneously perform AFM imaging and mapping of IR absorption by photothermal expansion. AFM-IR can map the composition, mechanics, and morphology of the mineral-amine-polymer interface with sub-micron resolution.

Ab initio and density functional theory (DFT) calculations and molecular dynamics (MD) simulations can be used to analyze the coating in 3 ways. (1) The simulations can assist in screening candidate alkaline minerals and binders, at different molar ratios as applicable, by simulating their $CO_2$ diffusion coefficient and computing their $CO_2$ absorption capacity. (2) The calculations can be used to gain atomistic and molecular-level insight into the mechanisms underlying $CO_2$ absorption as well as interactions between $CO_2$ and the composite ingredients. This will be done by computing the coordination number, total energy, and residence time of $CO_2$ and its interaction energy and radial distribution function with respect to the coating components. Simulations can be carried out at different temperatures and water contents in the binder to further analyze the influence of these factors on the kinetics of $CO_2$. (3) The calculations can be used to test the influence of carbonation on the hardness and mechanical properties of the coating at the nanometer scale (e.g., on the order of a few million atoms).

The thermal emissivity of the disclosed coatings can be analyzed using the material's thermal properties, such as thermal conductivity, density, and specific heat. The optical characteristics of the material can be analyzed including chromatic coordinates and whiteness to understand their influence on the radiation absorption of the material. Reflective measurements within the range of solar radiation can be made to obtain the solar reflectance of the material. A solar simulation analysis and infrared thermography (IRT) can be performed to test the behavior of material surface in interaction with solar irradiance. The results can be validated using the findings from the physical test with a scaled demonstrator. Energy simulation with EnergyPlus™ can be used to assess the impacts of the disclosed coatings on the cooling- and total energy savings of a sample building. The results can help estimate the energy-related carbon avoidance to be achieved using the disclosed coatings.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A coating composition comprising:
   alkaline mineral particles comprising an oxide of an alkaline earth metal; and
   an amine-containing polymer comprising polyethylene terephthalate,
   wherein the amine-containing polymer is adsorbed on the alkaline mineral particles.

2. The coating composition of claim 1, wherein the alkaline mineral particles comprise one or more of MgO, CaO, $CaSiO_3$, $Ca_2SiO_4$, and $Mg_2SiO_4$.

3. The coating composition of claim 2, wherein the alkaline mineral particles have a diameter in a range of about 1 nm to about 100 nm.

4. The coating composition of claim 1, further comprising water, alcohol, or both.

5. The coating composition of claim 4, further comprising one or more resin binders.

6. The coating composition of claim 5, wherein the one or more resin binders comprises an epoxy resin, an acrylic resin, or both.

7. The coating composition of claim 5, wherein the one or more resin binders comprise poly(methyl methacrylate), poly[(vinyl acetate)-co-(methy/ethyl/butyl acrylate)], or both.

8. The coating composition of claim 1, further comprising a silicone polymer.

9. The coating composition of claim 8, wherein the silicone polymer comprises a functionalized polysilsesquioxane.

10. The coating composition of claim 9, wherein the functionalized polysilsesquioxane comprises poly(dimethylsiloxane).

11. The coating composition of claim 1, further comprising one or more pigments.

12. The coating composition of claim 1, wherein the coating composition reflects solar radiation.

13. A coating formed from the coating composition of claim 1.

14. A method of storing carbon dioxide, the method comprising:

contacting carbon dioxide with the coating composition of claim 1;

capturing the carbon dioxide with the amine-containing polymer;

transporting the carbon dioxide to the oxide of the alkaline earth metal; and forming an alkaline earth metal carbonate species.

15. A method of forming a coating composition, the method comprising:

at least partially coating alkaline mineral particles with an amine-containing polymer comprising polyethylene terephthalate, wherein the alkaline mineral particles comprise an oxide of an alkaline earth metal; and dispersing the alkaline mineral particles in a liquid to yield the coating composition.

16. The method of claim 15, wherein the coating composition further comprises one or both of a resin binder and a silicone polymer.

17. The method of claim 15, wherein the coating composition further comprises one or more pigments.

18. The method of claim 15, wherein the alkaline mineral particles comprise one or more of $MgO$, $CaO$, $CaSiO_3$, $Ca_2SiO_4$, and $Mg_2SiO_4$.

\* \* \* \* \*